United States Patent [19]
Sakuma et al.

[11] Patent Number: 5,970,034
[45] Date of Patent: Oct. 19, 1999

[54] MULTIPLE-BEAM OPTICAL RECORDING APPARATUS

[75] Inventors: Nobuo Sakuma, Inagi; Magane Aoki, Yokosuka, both of Japan

[73] Assignee: Ricoh Company, Ltd., Tokyo, Japan

[21] Appl. No.: 08/797,738

[22] Filed: Feb. 11, 1997

[30]     Foreign Application Priority Data

Feb. 14, 1996   [JP]   Japan ................................ 8-027054

[51] Int. Cl.⁶ ............................. G11B 7/00; G02B 26/08
[52] U.S. Cl. ..................... 369/44.38; 359/204; 347/243
[58] Field of Search ................................ 359/204, 206,
    359/216; 369/214.14, 44.38; 347/243, 241,
    236, 246, 244, 232, 260, 261

[56]              References Cited

U.S. PATENT DOCUMENTS 4,474,422  10/1984  Kitamura ............................... 359/204
5,014,075   5/1991  Okino ...................................... 347/243
5,245,462   9/1993  Kanci et al. ........................... 359/204
5,461,412  10/1995  Paoli et al. ............................. 347/243
5,552,820   9/1996  Genovese ............................... 359/204
5,724,087   3/1998  Sugano et al. .......................... 347/243

FOREIGN PATENT DOCUMENTS 56-67277   6/1981  Japan .
64-10805   2/1989  Japan .
5-127111   5/1993  Japan .
6-123844   5/1994  Japan .
7-209596   8/1995  Japan .

*Primary Examiner*—Thang V. Tran
*Attorney, Agent, or Firm*—Oblon, Spivak, McClelland, Maier & Neustadt, P.C.

[57]              ABSTRACT

A multiple-optical scanner includes an optical source that produces a plurality of optical beams such that the plurality of optical beams cross each other substantially at a location of a rotary polygonal mirror when viewed in a direction of a rotational axis of the rotary polygonal mirror.

32 Claims, 10 Drawing Sheets

FIG. 3 PRIOR ART
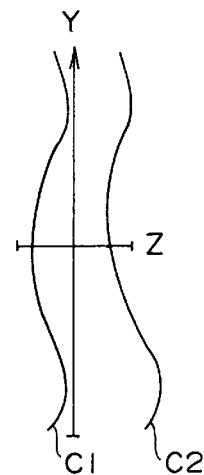
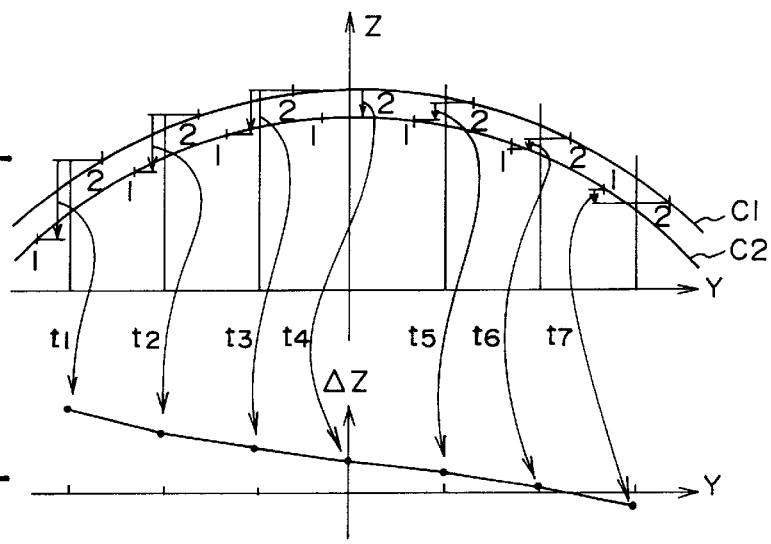
FIG. 4A PRIOR ART
FIG. 4B PRIOR ART

MULTIPLE-BEAM OPTICAL RECORDING APPARATUS

BACKGROUND OF THE INVENTION

1. Field of the Invention

The present invention generally relates to optical recording of information and more particularly to a multiple-beam optical recording system for recording information by means of a plurality of optical beams.

2. Discussion of Background

Optical scanners are used extensively for recording images in image recording apparatuses such as printers, copiers, facsimiles, scanners, and the like. Further, optical scanners are usable for various measuring purposes as well as for display devices. In order to improve the efficiency of scanning, multiple-beam optical scanners are proposed in which a plurality of optical beams are used for scanning an image formation surface simultaneously.

In a typical multiple-beam optical scanner, a plurality of optical beams each produced by an optical source such as a laser diode, are assembled with each other with minute mutual inclination angles for respective optical paths in a vertical scanning direction, such that an array of optical dots aligned in the vertical scanning direction is formed on a recording surface, after deflection and focusing of the optical beams by an optical deflector. The optical dots thus formed scan the recording surface simultaneously in a horizontal scanning direction in response to the deflection of the optical beams.

Such conventional multiple-beam optical scanners are, while capable of scanning the recording surface efficiently, have various problems associated with the use of two or more optical beams.

An example of such a multiple-beam optical scanner is known according to the Japanese Laid-open Patent Publication 7-209596 corresponding to the U.S. patent application Ser. No. 08/174,197, which describes a system in which two laser diodes disposed with a mutual separation of 25 $\mu$m in the vertical scanning direction are used for the optical source. Hereinafter, the foregoing prior art will be designated as "first prior art."

In the first prior art, the optical beams produced by the laser diodes are then deflected by the same mirror surface of a rotary polygonal mirror and are exited parallel in the vertical scanning direction. Thereby, the two optical beams are in a telecentric relationship in the vertical scanning direction, and the two optical beams scan the recording surface simultaneously over a length of 302.8 mm in the horizontal scanning direction with a mutual separation of 127 $\mu$m in the vertical scanning direction. As the two optical beams are telecentric in the vertical scanning direction, the "differential scan line bow" between two scanning lines formed simultaneously by the foregoing two optical beams, is suppressed within a limit of 3–5 $\mu$m. The differential scan line bow will be explained in more detail in later.

Further, the Japanese Laid-open Patent Publication 5-127111, designated hereinafter as "second prior art," describes another multiple-beam optical scanner in which a rotary deflector carrying polygonal facets is disposed before a location where the multiple optical beams cross each other, for reducing the size of the polygonal mirror facets. The optical beams deflected by the rotary deflector are then focused upon a recording surface.

In such multiple-beam optical scanners applied to an image recording apparatus for recording images as a result of scanning of the optical beams over a recording surface, there occurs a problem of distortion of the recorded image on the recording surface when the optical beams are deviated in position on the recording surface in the horizontal scanning direction. Such a distortion occurs when there is an error in the shape, composition or alignment of the optical components in the image recording apparatus. Further, such a distortion occurs also as a result of change of the environmental temperature.

Thus, in order to eliminate the problem of image distortion, conventional image recording apparatuses generally use optical sensors for detecting the timing of scanning of the optical beams in the horizontal scanning direction. Such optical sensors are disposed in the vicinity of the image recording surface, and the recording of image by the optical beams is carried out in synchronization with the output of the optical sensors for avoiding the distortion of the images.

In the foregoing multiple-beam scanner of the first prior art, it should be noted that the optical beams are caused to scan over the recording surface in the horizontal scanning direction such that the optical beams, while being separated from each other in the vertical scanning direction by a distance of about 127 $\mu$m, hit the respective scanning points having the same location as measured in the horizontal scanning direction. In other words, the optical beam spots formed on the recording surface by the optical beams are aligned in the vertical scanning direction in the first prior art. As the optical beams are separated only by the distance of 127 $\mu$m, the multiple-beam optical scanner of the first prior art is difficult to use different optical sensors for detecting the timing of scanning of the optical beams separately.

On the other hand, there is a proposal to set the path of the optical beams to be offset from each other also in the horizontal scanning direction for facilitating the timing detection of the optical beams by using separate optical sensors as proposed in the Japanese Laid-open Patent Publication 56-67277, which will be designated as "third prior art."

According to the third prior art, a laser diode array including a plurality of laser diodes forming a monolithic optical integrated circuit is used as the optical source, wherein the laser diode array is set with a tilting such that the laser diodes in the array are aligned in an oblique direction with respect to a rotational axis of the rotary polygonal deflector. Thereby, the optical beam spots formed on the recording surface are aligned obliquely to the horizontal scanning direction, and the optical beam spots are separated from each other on the recording surface in the horizontal scanning direction by a distance of 3.75 mm. Thus, the third prior art allows the separate detection of the timing of the optical beams by using separate optical sensors.

In the multiple-beam optical scanner of the second prior art and the third prior art, in which the optical beams are offset in the horizontal scanning direction, it should be noted that the optical beams reach the scanning points on the recording surface along respective optical paths that pass different locations of the optical elements disposed between the rotary deflector and the recording surface.

In an optical image recording apparatus that uses a finely focused optical beam for scanning over an image recording surface one-dimensionally in the horizontal scanning direction, each location of an optical element forming the image recording apparatus corresponds to a scanning point on the image recording surface. In other words, a ray forming a part of the finely focused optical beam reaches a predetermined scanning point on the image recording surface after passing through respective locations of the optical elements corresponding to the scanning point. Thus, the optical elements of such optical image recording apparatuses are optimized with respect to the shape, position, and the like, such that the ray forming the horizontally scanning optical beam reaches the predetermined scanning points consecutively and exactly.

When the multiple-beam optical scanner of the foregoing second or third prior art is applied to such an image recording apparatus, in which the optical beams pass respective paths offset in the horizontal as well as vertical scanning directions, the reflection or refraction caused by the optical elements may be different between the different optical beams. Such a difference in the optical path of the horizontally scanning optical beams causes the problem of the foregoing differential scan line bow.

Hereinafter, the foregoing problem of differential scan line bow will be explained in more detail with reference to FIG. 1 showing an optical system used in an optical image recording apparatus disclosed for example in a Japanese Laid-open Patent Publication 6-123844. It should be noted that the optical system of FIG. 1 itself is designed for recording an image on a recording surface by means of a single optical beam.

Referring to the drawings, the optical system includes a laser diode 1 acting as an optical source for producing an optical beam, wherein the optical beam is caused to pass through a collimator lens 2 and a cylindrical lens 3 and hits a rotary polygonal deflector 4. The rotary polygonal deflector 4 causes a deflection of the optical beam incident thereto, and the optical beam produced as a result of the deflection reaches a recording surface 7 after reflection by a focusing mirror 5 and refraction by a cylindrical lens 8. As a result of the rotation of the polygonal deflector 4, the optical beam scans over the recording surface in the horizontal scanning direction coincident to the direction indicated by a Y-axis in FIG. 1. It should be noted that the vertical scanning direction is coincident to the X-direction on the recording surface 7.

When the multiple-beam optical scanner of the foregoing second or third prior art is applied to the optical system of FIG. 1, two optical beams C1 and C2 scan over the recording surface 7 in the horizontal scanning direction as indicated in FIG. 2, wherein it should be noted that FIG. 2 shows the optical beams C1 and C2 at respective different instances chosen such that the optical beam C2 hits the same horizontal scanning position or Y-coordinate which is previously reached by the optical beam C1. When the optical beams C1 and C2 are compared at the same instance, the horizontal scanning position of the optical beam C1 is different from the horizontal scanning position of the optical beam C2 on the recording surface 7, and the separate detection of timing of the optical beams C1 and C2 is achieved easily by using separate optical sensors.

On the other hand, the relationship of FIG. 2 clearly indicates that the angle of incidence of the optical beam C2 to the rotary polygonal deflector 4 is different from the angle of incidence of the optical beam C1 at the moment or instance when the optical beam C2 hits the same scanning point which is hit previously by the beam C1. It should be noted that there is formed a cross angle $2\Delta\alpha$ between the optical beam C1 and the optical beam C2. Thus, the optical beam C2 reaching the same scanning point on the recording surface 7 hit previously by the optical beam C1 travels along a path different from the path of the optical beam C1. This means that the optical beam C2 passes the focusing mirror 5 as well as the cylindrical lens 8 at a location different from the location which the optical beam C1 has passed. As a result of such a different in the optical path between the optical beams C1 and C2, there appears a differential scan line bow as indicated in FIG. 3.

Referring to FIG. 3 showing the scanning lines formed by the optical beams C1 and C2, it will be noted that each of the scanning lines has an undulated shape in the vertical scanning direction or Z-direction, wherein the shape for the scanning line C1 is not exactly analogous to the shape of the scanning line C2. In other words, the scanning line drawn by the optical beam C2 is not a mere translation of the scanning line drawn by the optical beam C1. This net difference between the two scanning lines.

The reason of such a differential scan line bow is attributed to the fact that the focusing mirror 5 is slightly curled about an axis parallel to the horizontal scanning direction or the Y-direction. Further, the optical beams C1 and C2 are directed so as to hit the mirror 5 at respective points that are offset with each other in the vertical scanning direction or the z-direction, in order to secure a sufficient separation in the vertical scanning direction on the recording surface 7.

FIG. 4A shows the scanning of the optical beams C1 and C2 over the mirror 5, wherein the point designated by "1" designates the beam spot formed by the beam C1 while the point designated by "2" designates the beam spot formed by the beam C2. Both of the spots "1" and "2" form respective, mutually parallel arcuate paths on the mirror 5, wherein it should be noted that the timing of the scanning is slightly different between the optical beam C1 and the optical beam C2. It should be noted that FIG. 4A shows the spot "1" and the associated spot "2" at a common instance, contrary to the representation of FIG. 2 that shows the beams C1 and C2 at different instances. In FIG. 2, the set of the spot "1" and the spot "2" moves in the Y-direction with time as the time increases from $t_1$ to $t_7$.

Referring to FIG. 4A, it should be noted that the separation between the beam spot "1" and the beam spot "2" in the vertical scanning direction changes with time due to the difference in the timing of the beam spots "1" and "2" on the mirror surface 5. As a result, the vertical separation between the beam spots "1" and "2" changes with the progress of scanning as indicated in FIG. 4B. Such a differential scan line bow can reach as much as 30 $\mu$m, while this value of the differential scan line bow is substantial in view of the pitch of 63.5 $\mu$m of the horizontal scanning lines formed by the optical beams C1 and C2.

The foregoing problem of the differential scan line bow can be eliminated by a construction proposal in the Japanese Patent Publication 64-10805 that uses use a laser diode array including laser diode elements aligned in the horizontal scanning direction, for the optical source as indicated in FIG. 5. The reference will be designated hereinafter as "fourth prior art."

Referring to FIG. 5, the optical system of the fourth prior art includes a laser diode array 51 including a plurality of laser diode elements disposed with a mutual pitch of about 100 $\mu$m in the plane parallel to the plane of scanning of the optical beams. Further, the laser diode elements may be disposed with a slight mutual offset in the vertical scanning direction. The optical beams thus produced are then passed through an afocal collimating lens 52 and focused upon the recording surface 58 via a cylindrical lens 57 after deflection by a rotary polygonal deflector 56 that carries thereon mirror facets 56a.

The optical system of the fourth prior art further includes an optical system 55 between the lens 52 and the deflector 56, such that an exit pupil 54 of the lens 52 becomes conjugate to the mirror facet 56a of the rotary polygonal mirror 56 within the plane parallel to the horizontal scanning caused by the optical beams c1 and c2. The optical system 55 thereby acts as a demagnifying optical system.

It should be noted that the foregoing forth prior art merely intends to use the optical system 55 so as to reduce the diameter of the polygonal mirror that forms the optical deflector 56. On the other hand, the construction of FIG. 5 unintentionally realizes an arrangement of the optical elements such that the optical beams produced by the laser diode array 51 pass, after deflection by the deflector 56, through substantially the same optical path when the optical beams are directed to the same horizontal scanning position of the recording surface 58. Thus, the construction of FIG. 5 can successfully minimize the foregoing problem of the differential scan line bow.

On the other hand, the construction of FIG. 5 requires the optical system 55 between the afocal collimating optical system 52 and the deflector 56 as noted already, while use of such an optical system 55 requires a substantial space in the image recording apparatus. Further, use of such an optical system inevitably increases the cost of the image recording apparatus.

SUMMARY OF THE INVENTION

Accordingly, it is a general object of the present invention to provide an optical image recording apparatus wherein the foregoing problems are eliminated.

Another and more specific object of the present invention is to provide an optical image recording apparatus for recording images on an image recording surface wherein the problem of distortion of recorded images on the image recording surface is minimized.

Another object of the present invention is to provide an optical image recording apparatus, comprising:

a rotary optical deflector carrying a mirror facet, said rotary optical deflector being rotatable about a rotational axis;

an optical source for producing a plurality of optical beams simultaneously, such that said plurality of optical beams are separated from each other in a direction parallel to said rotational axis and such that said plurality of optical beams cross with each other substantially at a cross point when viewed in a direction parallel to said rotational axis;

said cross point being located in the vicinity of said rotational axis of said rotary optical deflector, said rotary optical deflector thereby producing a plurality of scanning optical beams corresponding respectively to said plurality of optical beams incident thereto as a result of deflection at said mirror facet;

an optical recording surface; and an optical system disposed between said rotary optical deflector and said optical recording surface, for focusing said plurality of scanning optical beams on said optical recording surface.

Another object of the present invention is to provide a multiple-beam optical scanner for scanning a surface by means of a plurality of optical beams, comprising:

a rotary optical deflector carrying a mirror facet, said rotary optical deflector being rotatable about a rotational axis;

an optical source for producing a plurality of optical beams simultaneously, such that said plurality of optical beams are separated from each other in a direction parallel to said rotational axis and such that said plurality of optical beams intersect with each other substantially at a cross point when viewed in a direction parallel to said rotational axis;

said cross point being located in the vicinity of said rotational axis of said rotary optical deflector, said rotary optical deflector thereby producing a plurality of scanning optical beams corresponding respectively to said plurality of optical beams incident thereto as a result of deflection at said mirror facet;

said plurality of optical beams thereby causing a scanning over a scanning surface after deflection by said rotary optical deflector.

According to the present invention, the plurality of scanning optical beams scan over the optical recording surface in response to the rotation of the rotary optical deflector generally in a horizontal scanning direction to form a plurality of optical scanning lines separated from each other in a vertical scanning direction on the optical recording surface, wherein a scanning optical beam reaching an arbitrary scanning point on the optical recording surface travels to the foregoing scanning point exactly along a path of a scanning optical beam that has previously reached the same scanning point when viewed in a direction perpendicular to the horizontal scanning direction. Thereby, the optical beams experience exactly the same refraction or reflection when reaching the respective scanning points that have the same coordinate in the horizontal scanning direction on the optical recording surface through the optical system, and the distortion of the recorded image caused as a result of non-uniform refraction or reflection of the optical beams is successfully eliminated.

Other objects and further features of the present invention will become apparent from the following detailed description when read in conjunction with the attached drawings.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein:

FIG. 3 is a diagram showing the problem associated with the use of the optical scanning system of FIG. 2;

FIGS. 4A and 4B are diagrams showing a distortion of an image caused by a deviation of optical scanning points in the optical scanning system of FIG. 2;

DETAILED DESCRIPTION OF THE PREFERRED EMBODIMENTS

Figure 1:
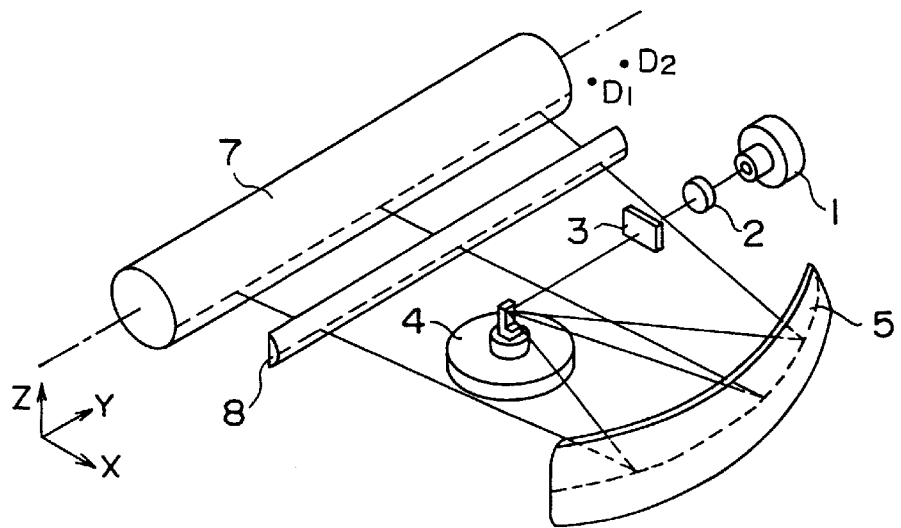
FIG. 1 is a diagram showing the construction of a conventional optical recording apparatus.
Figure 2:
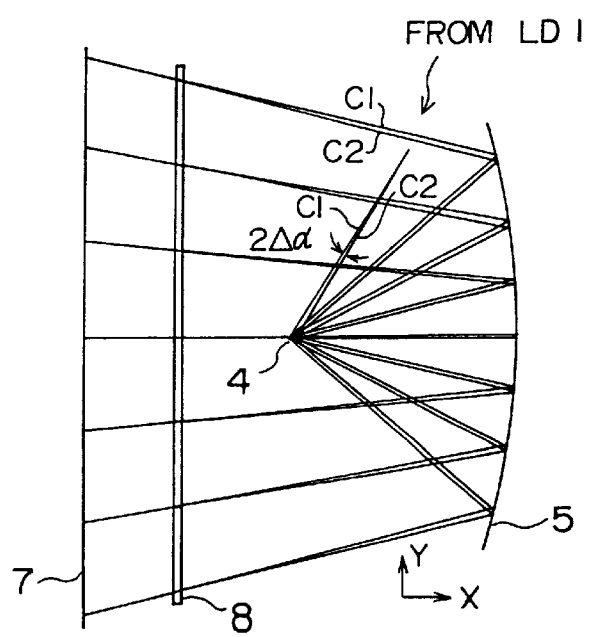
FIG. 2 is a diagram showing a conventional optical scanning system that uses a plurality of optical beams.
Figure 5:
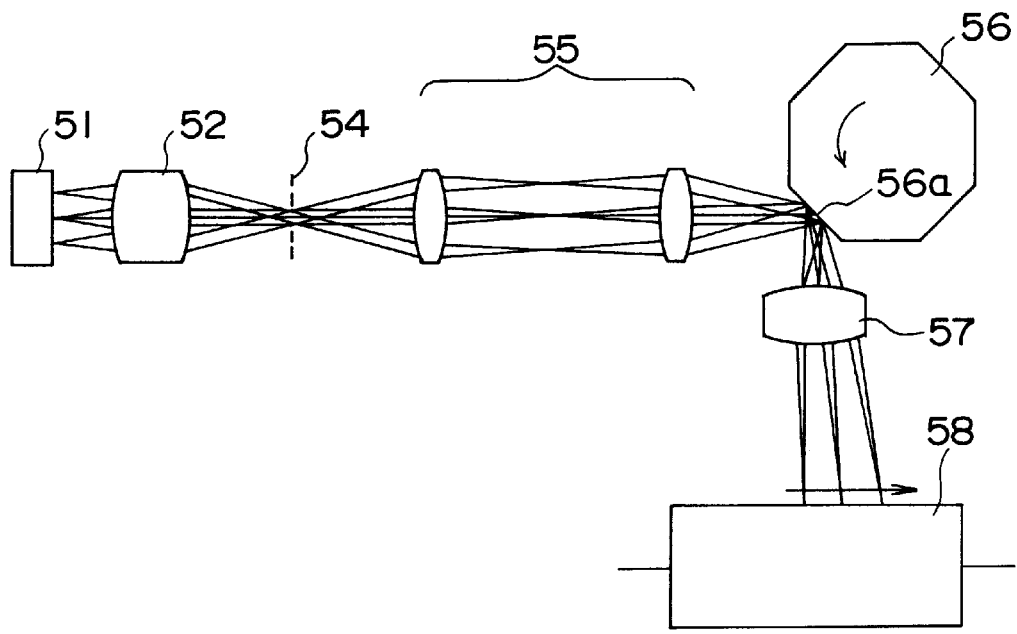
FIG. 5 is a diagram showing a conventional construction that is effective for eliminating the distortion of the image shown in FIGS. 4A and 4B.
Figure 6:
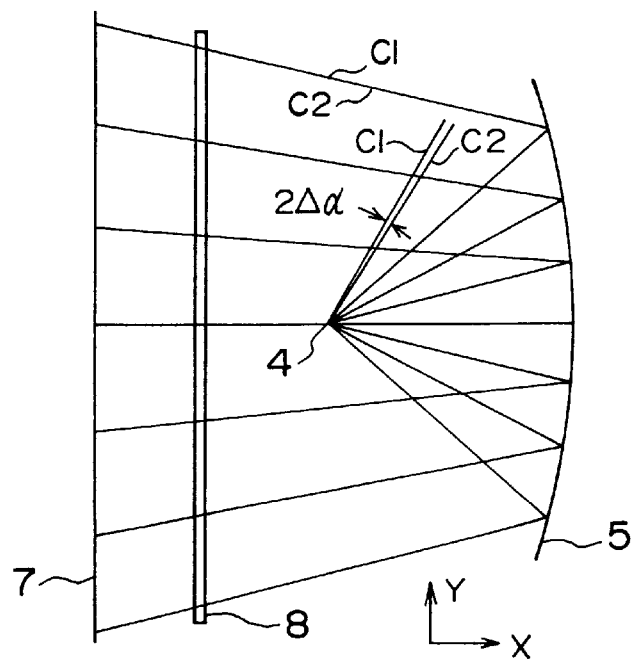
FIG. 6 is a diagram showing the construction of an optical scanning system according to a first embodiment of the present invention.

Referring now to the drawings, wherein like reference numerals designate identical or corresponding parts throughout the several views, and more particularly to FIG. 6 thereof, there is illustrated a diagram showing the construction of an optical scanning system according to a first embodiment of the present invention, wherein it should be noted that the optical scanning system of FIG. 6 is designed for use in an optical recording apparatus of FIG. 1. Thus, those parts corresponding to the parts shown in FIG. 1 are designated by the corresponding reference numerals and the description thereof will be omitted.

Referring to FIG. 6, it should be noted that the present embodiment directs the optical beams c1 and c2 such that the optical beams c1 and c2 cross at a mirror facet of the rotary polygonal deflector 4. Thereby, the optical beam c2 reach a predetermined scanning point on the recording surface 7 that has been previously hit by the optical beam c1, along an optical path substantially identical to the optical path of the optical beam c1 when viewed in a direction of the rotary axis of the deflector 4.

Figure 7A:
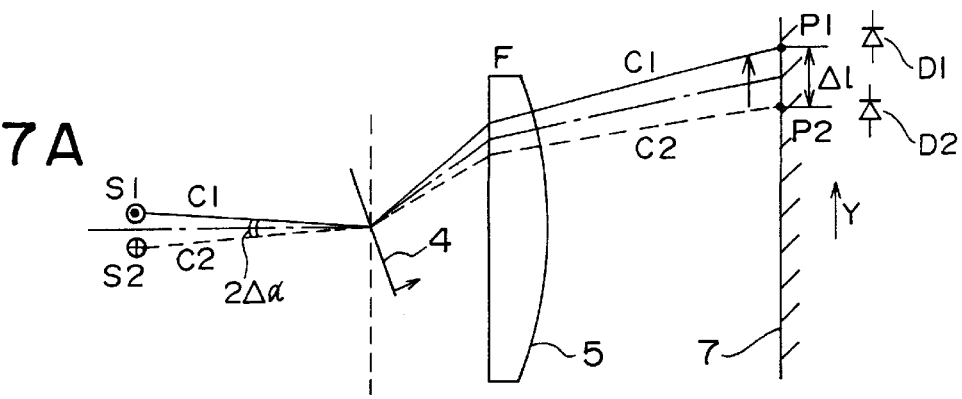
FIGS. 7A and 7B are diagrams showing the principle of the present invention as applied to the first embodiment in more detail.
Figure 7B:
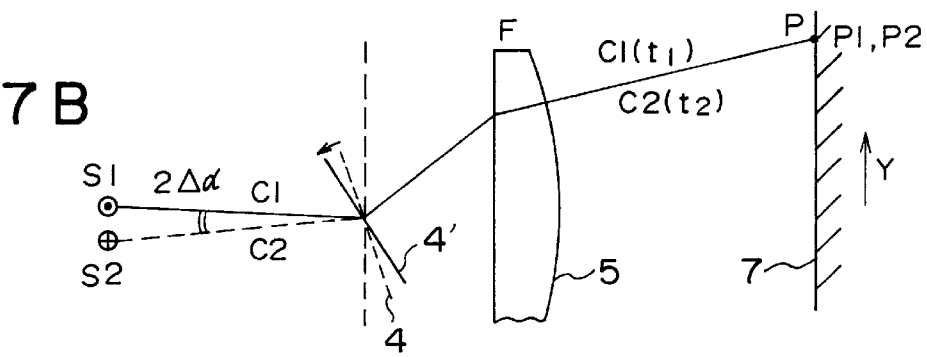

FIGS. 7A and 7B show the scanning of the optical beams c1 and c2 in more detail, wherein FIG. 7A shows the situation at a specific moment or instance while FIG. 7B shows the state in which the optical beam c2 hits the same Y-location of the recording surface 7 that has been previously hit by the optical beam c1. In other words, FIG. 7B shows two different instances in superposition. Further, the line indicated by the numeral 4 represents the direction of the mirror facet 4 of the rotary polygonal deflector 4. With the rotation of the polygonal deflector 4, the direction of the mirror facet rotates as indicated by an arrow. In FIGS. 7A and 7B, the focusing mirror 5 as well as the cylindrical lens 8 of FIG. 6 are symbolically represented by a lens 5.

Referring to FIG. 7A, the optical beam c1 produced by an optical source s1 hits a point P1 on the optical recording surface 7 after deflection by the deflector 4 while the optical beam c2 produced by an optical source s2 hits a point P2 separated from the point P1 on the recording surface 7 by a distance Δl in the Y-direction or horizontal scanning direction. The distance Δl is set typically to 3.75 mm so as to allow use of separate photodetectors D1 and D2 shown in FIG. 7A for detecting the timing of optical scanning. It should be noted that the photodetectors D1 and D2 are provided adjacent to the optical recording surface 7 on the horizontal scanning line as indicated in FIG. 1. As a result of rotation of the deflector 4, the point P2 of the optical beam c2 moves toward the point P1 as in the Y-direction as indicated in FIG. 7A.

As already noted, FIG. 7B shows the two states in superposition. Thus, at a first instance t1, the optical beam c1 produced by the optical source s1 reaches the point P1 after reflection by the deflector 4, while at a second instance t2, the optical beam c2 produced by the optical source s2 reaches the point P2, which is identical to the point P1 in the Y-direction, after reflection by the deflector 4 now in having the mirror facet in the direction 4'. Thus, the points P1 and P2 are designated also by P in FIG. 7B.

Thereby, it is important to note that the beams c1 and c2 are directed from the respective optical sources s1 and s2 to the deflector 4 such that the beams c1 and c2 substantially cross at the mirror facet of the rotary deflector 4. As a result of this, the optical beam c2, reflected by the deflector and reaching the point P, travels substantially an identical optical path of the optical beam c1 that reaches the same point P. Thereby, the optical beam c2 experiences the same optical refraction or reflection that the optical beam c1 has experienced by the optical system 5, and the problem of the differential scan line bow caused as a result of the optical beams c1 and c2 passing through the optical system 5 at different locations is successfully eliminated.

Figure 8A:
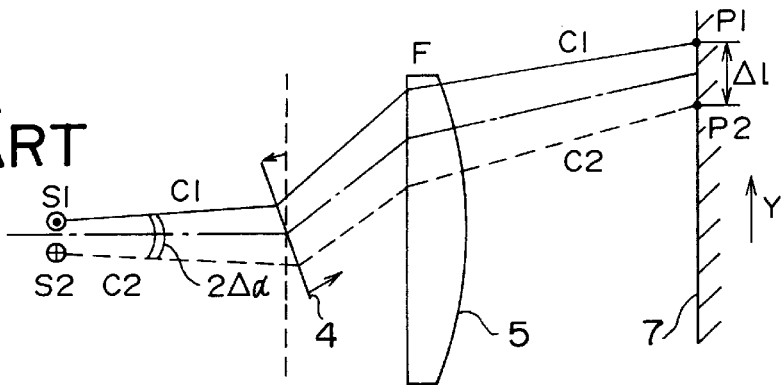
FIGS. 8A and 8B are diagrams showing the detailed scanning achieved in the prior art optical scanning system of FIG. 2 for the purpose of comparison.
Figure 8B:
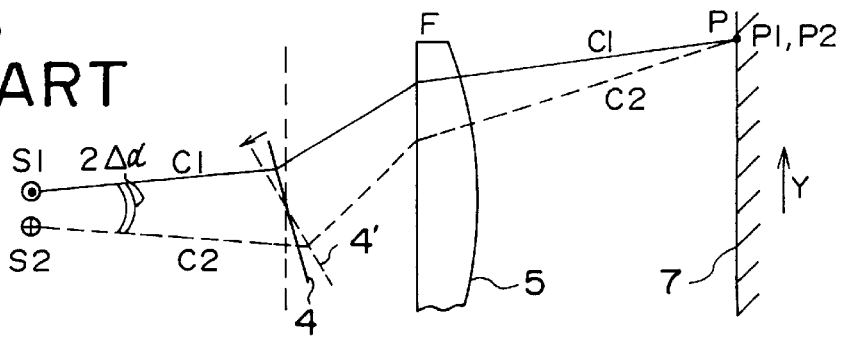

FIGS. 8A and 8B show the conventional scanning system for the purpose of comparison, wherein those parts described previously are designated by the same reference numerals and the description thereof will be omitted.

Figure 9:
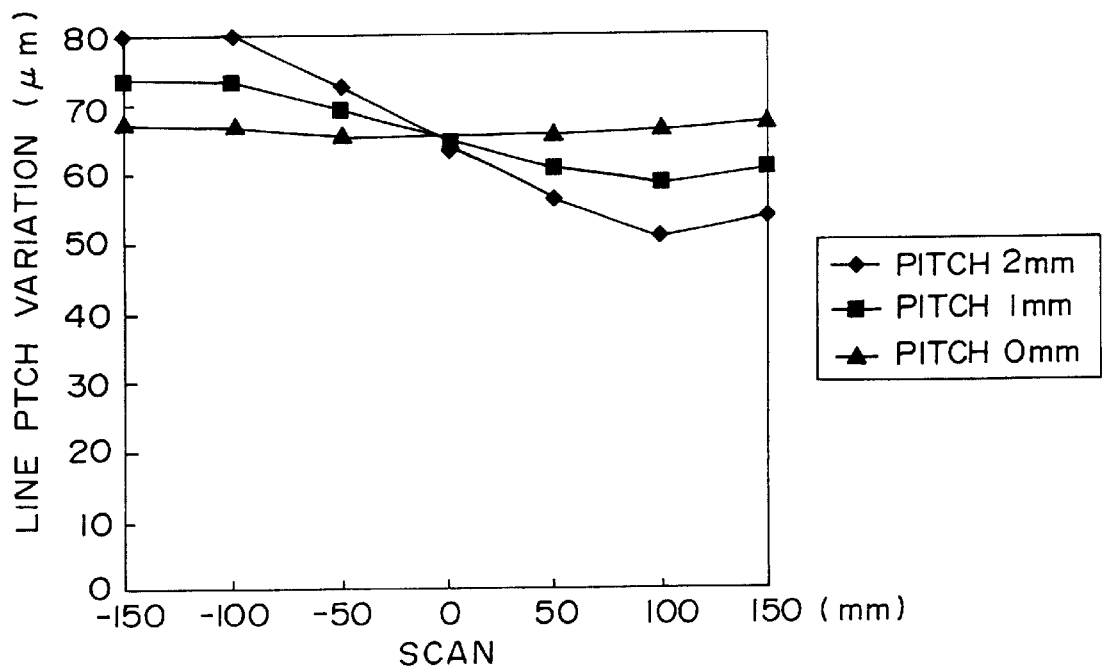
FIG. 9 is a diagram showing the variation of the line pitch between adjacent two scanning lines formed by two optical beams in the conventional optical scanning system of FIGS. 8A and 8B.

Referring to FIG. 8A, the optical beams c1 and c2 are emitted from the optical sources s1 and s2 in mutually divergent directions such that the foregoing separation Δl is secured on the optical recording surface 7. In such a conventional optical scanning system, the optical beam reaching the point P at the instance t2 passes through an optical path substantially different from that of the optical beam c1 at the instance t1 as indicated in FIG. 8B. As a result of the difference in the optical path through the optical system 5, there appears a variation in the pitch between the optical scanning line produced by the beam c1 and the optical scanning line produced by the beam c2 as indicated in FIG. 9 wherein the horizontal axis of FIG. 9 represents the full stroke of the optical beam along the horizontal scanning line. Further, the result indicated by solid circles represents the case in which the distance Δ1 between the points P1 and P2 on the recording surface 7 is set to 0 mm, while the result indicted by solid squares represent the case in which the distance Δl is set to 1 mm. Further, the result indicated by solid circles represent the case in which the foregoing distance Δl is set to 2 mm.

Referring to FIG. 9, the variation increases with an increase in the foregoing distance Δl between the points P1 and P2. The result of FIG. 9 clearly indicates that the distortion of the recorded image increases when the distance Δl is increased for improved detection of the timing of the optical beams c1 and c2. When the distortion of the recorded image is reduced, on the other hand, the detection of timing of the optical beams c1 and c2 becomes difficult.

Figure 10:
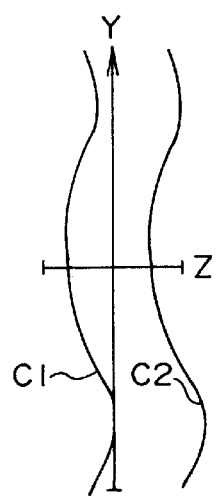
FIG. 10 is a diagram showing the elimination of the problem of differential scan line bow achieved by the present invention.

FIG. 10 shows the result achieved by the optical scanning system of FIG. 6.

Referring to FIG. 10, it should be noted that the optical scanning line c1 formed on the optical recording surface 7 by the optical beam c1 and the optical scanning line c2 formed on the same optical recording surface 7 by the optical beam c2 are analogous in shape and overlap substantially when the optical scanning line c2 is translated to the position of the optical scanning line c1. In fact, the differential scan line bow can be suppressed within 3–4 μm when the nominal separation between the optical scanning line c1 and the optical scanning line c2 in the vertical scanning direction is set to 63.5 μm.

Figure 11:
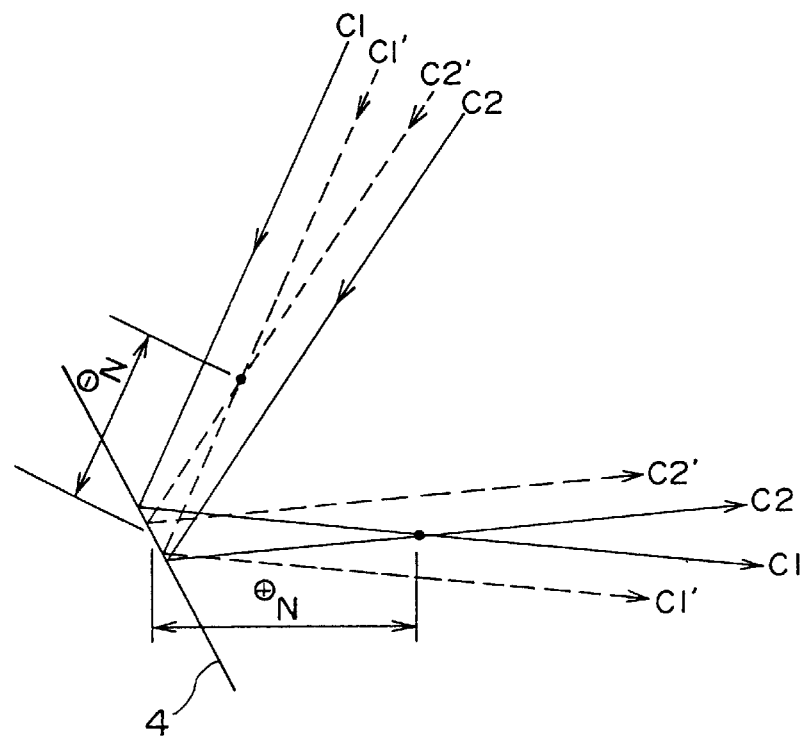
FIG. 11 is a diagram showing the details of the optical scanning system of FIG. 6.

FIG. 11 shows the deflection of the optical beams c1 and c2 by the optical deflector 4 in detail.

It should be noted that the position of the mirror facet on the polygonal optical deflector 4 changes slightly as a result of rotation of the deflector 4. Thus, it is not possible to focus the optical beams c1 and c2 exactly on the mirror facet of the polygonal deflector 4, and the optical beams c1 and c2 may cross at a cross point after a reflection by the mirror facet of the polygonal deflector 4 as indicated by continuous lines c1 and c2 in FIG. 11, or at a cross point before the reflection as indicated by dotted lines c1' and c2' also shown in FIG. 11.

Thus, in order to achieve the desired suppression of the distortion of the recorded images on the recording surface 7, a distance N between the cross point and the polygonal deflector 4, more specifically the distance between the cross point and the rotational axis of the polygonal deflector 4, should be sufficiently small.

Table I below summarizes the relationship between the foregoing distance N and the differential scan line bow for the case in which the optical beams c1 and c2 cross at a cross angle 2Δα of 0.6°, wherein the positive value of the distance N in the table indicates the case in which the cross point is located between the deflector 4 and the recording surface 7 while the negative value of the distance N corresponds to the case in which the cross point is located between the deflector 4 and the optical sources s1 and s2. The result of TABLE I is for the case of achieving the distance Δl of 2 mm.

TABLE I

| N (mm) | differential scan line bow (μm) |
|---|---|
| −71.0 | 13 |
| −51.0 | 9 |
| −7.5 | 3 |
| 0 | 3 |
| +6.0 | 3 |
| +50.0 | 9 |

As a differential scan line bow of less than 10 μm is allowable, the foregoing result indicates that the distance N of smaller than about ±60 mm is allowable.

When the cross angle 2Δα is set smaller, the allowable distance N increases due to the fact that the optical beam c2 travels in the vicinity of the optical path of the optical beam c1. In this case, however, the separation Δl of the optical beam spots P1 and P2 on the optical recording surface 7 decreases and the detection of the timing of the optical beams c1 and c2 becomes difficult.

In the vertical scanning direction or Z-direction, the optical beams c1 and c2 are separated such that the distance between the optical scanning line c1 and the optical scanning line c2 shown in FIG. 10 are separated on the optical recording surface 7 with a nominal pitch of horizontal scanning or an integer multiple thereof in the vertical scanning direction, as usual in a conventional multiple-beam optical recording apparatus.

Figure 12:
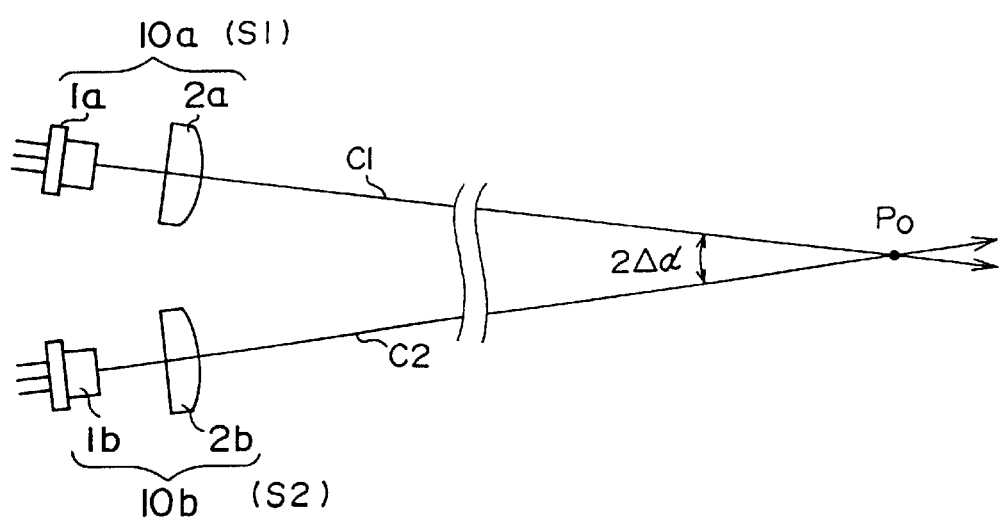
FIG. 12 is a diagram showing an arrangement of laser diodes for realizing the optical scanning system of FIG. 6.

FIG. 12 shows the construction of the optical sources s1 and s2 in detail.

Referring to FIG. 12, the optical source s1 designated collectively by a numeral 10a includes a laser diode 1a for emitting a laser beam and a collimator lens 2a for producing the optical beam c1 in the form of a parallel optical beam from the laser beam produced by the laser diode 1a. Similarly, the optical source S2 designated collectively by a numeral 10b includes a laser diode 1a for emitting a laser beam and a collimator lens 2b for producing the parallel optical beam c2 from the laser beam produced by the laser diode 1b. The optical sources 10a and 10b are disposed with a mutually inclined relationship in a plane perpendicular to the rotational axis of the polygonal optical deflector 4 such that the optical beams c1 and c2 form a cross angle 2Δα at a cross point P0 corresponding to the rotational axis of the optical deflector 4.

As the optical axis of the laser diode and the optical axis of the corresponding collimator lens are coincident in the embodiment of FIG. 12, each of the optical beams c1 and c2 is substantially free from distortion of the optical beam spot on the recording surface 7.

Figure 13:
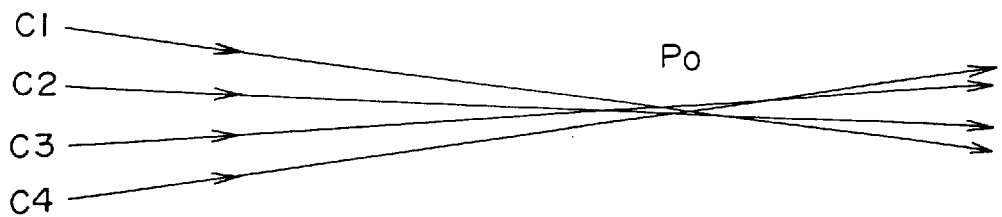
FIG. 13 is a diagram showing a part of the optical scanning system according to a second embodiment of the present invention.

FIG. 13 shows a second embodiment of the present invention.

Referring to FIG. 13, four optical beams c1–c4 are used to scan the recording surface 7 simultaneously in the present embodiment. In FIG. 13, it should be noted that, while the optical beams c1–c4 intersect with each other generally at a cross-over point P0, it is not necessary that all of the four beams c1–c4 intersect exactly at the point P0. As noted previously, it is sufficient that the any two optical beams intersect within the distance N of about ±60 mm from the rotational axis of the rotary polygonal deflector 4.

Figure 14:
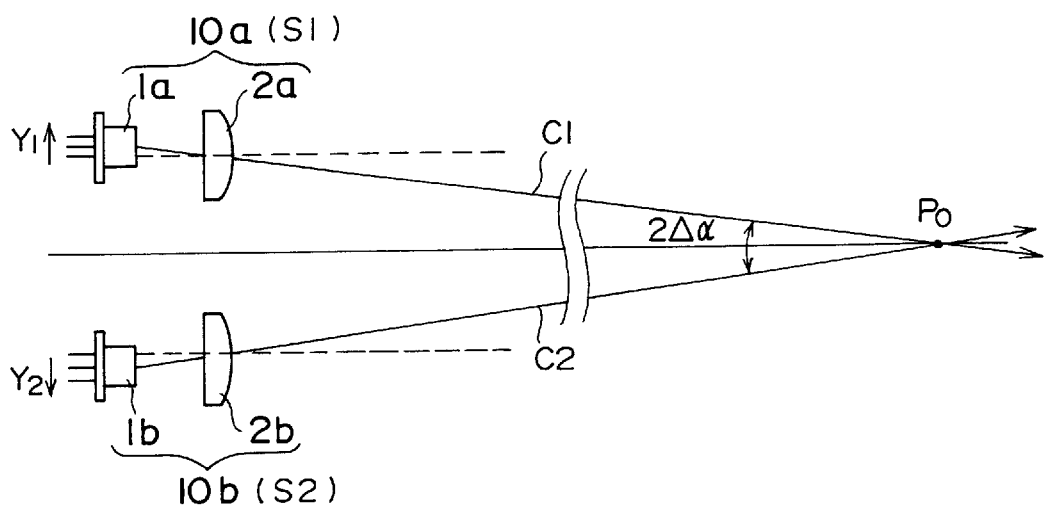
FIG. 14 is a diagram showing a part of the optical scanning system according to a third embodiment of the present invention.

FIG. 14 shows the construction of the optical source according to a third embodiment of the present invention, wherein those parts described previously are designated by the same reference numerals and the description thereof will be omitted.

Referring to FIG. 14, the laser diodes 1a and 1b are disposed so as to face in the same direction as indicated by broken lines, and the collimator lens 2a is disposed in alignment with the laser diode 1a on the optical axis thereof indicated by the broken line. The collimator lens 2b is provided similarly in alignment with the laser diode 1b.

In the construction of FIG. 14, the laser beams emitted obliquely to the optical axes of the laser diodes 1a and 1b are used for the optical beams c1 and c2. Thus, the optical beams c1 and c2 pass through the collimator lenses 2a and 2b respectively in an oblique direction and crosses at the point P0 with the angle 2Δα.

By constructing the optical sources s1 and s2 in such a manner, it is possible to adjust the position of the cross point P0 to or from the deflector 4 for a minute distance by merely moving the optical source 10a laterally in the direction $Y_1$ or moving the optical source 10b in the direction $Y_2$. The construction of FIG. 14 is particularly useful when using a laser diode having a divergent radiation lobe with a substantial intensity of optical radiation in an oblique direction for the laser diodes 1a and 1b.

Figure 15:
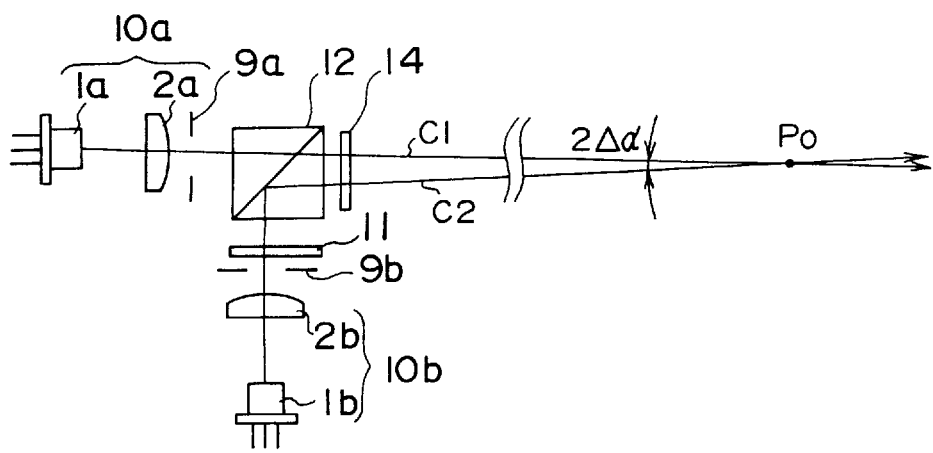
FIG. 15 is a diagram showing a part of the optical scanning system according to a fourth embodiment of the present invention.

FIG. 15 shows the construction of the optical scanning system according to a fourth embodiment of the present invention, wherein those parts described previously are designated by the same reference numerals and the description thereof will be omitted.

Referring to FIG. 15, there is provided an aperture 9a on the optical axis of the laser diode 1a for extracting an optical beam traveling along the optical axis of the laser diode 1a and hence the optical axis of the collimator lens 2a, wherein the optical beam enters a polarization beam-splutter 12 disposed on the optical path of the optical beam thus extracted by the aperture 9a.

Further, the optical scanning system includes the laser diode 1b and the collimator lens 2b generally in a co-planar relationship with the laser diode 1a and the collimator lens 2a on a plane perpendicular to the rotational axis of the deflector 4, such that the laser beam emitted by the laser diode 1b hits the polarization beam-splitter 12, after passing through the collimator lens 12b and an aperture 9b, in a direction generally perpendicular to the direction of the laser beam emitted through the aperture 9a into the beam-splitter 12, wherein the aperture 9b is disposed in alignment with the optical axis of the laser diode 1b and hence the optical axis of the collimator lens 2b. Thereby, the laser beam from the laser diode 1a passes through the beam-splitter 12 and forms the foregoing optical beam c1 after conversion to a circularly polarized optical beam upon passage through a half-wavelength plate 14. On the other hand, the laser beam produced by the laser diode 1b is reflected by the beam-splitter 12 and forms the foregoing optical beam c2 after passing through the half-wavelength plate 14.

By using the optical beam-splitter 12, it is possible to set the converging angle $2\Delta\alpha$ to be very small, without being constrained by the problem that the laser diodes 1a and 1b come excessively close to each other or even contact each other in the construction of FIG. 12 or 14. In other words, the construction of FIG. 15 is advantageous for setting the angle $2\Delta\alpha$ to be very small, below the limit that is possible in the construction of FIG. 12 or 14. This further means that the construction of FIG. 15 allows use of a large size optical source for the optical source 10a or 10b while holding the cross angle $2\Delta\alpha$ to be very small.

Figure 16:
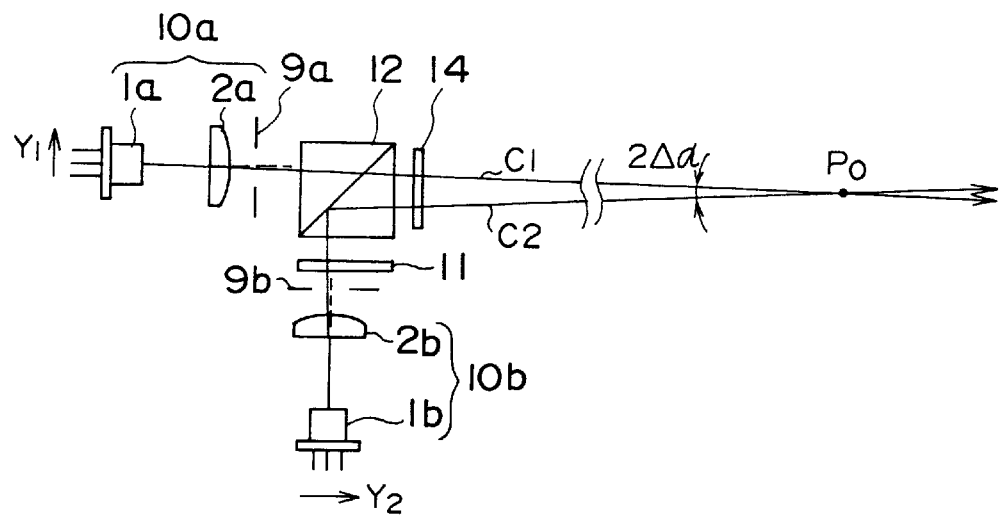
FIG. 16 is a diagram showing a part of the optical scanning system according to a fifth embodiment of the present invention.

FIG. 16 shows the construction of the optical scanning system according to a fifth embodiment of the present invention, wherein those parts described previously are designated by the same reference numerals and the description thereof will be omitted.

In the present embodiment, the apertures 9a and 9b disposed so as to extract a laser beam emitted obliquely to the optical axes of the respective laser diodes 1a and 1b, and thus, the laser beams travel through the beam-splitter 12 obliquely as compared with the case of FIG. 15. In the construction of FIG. 16, it is possible to move the cross point P0 to and from the deflector 4 for a minute distance, by moving the laser diode 1a in the $Y_1$-direction or the laser diode 1b in the $Y_2$-direction, similarly to the embodiment of FIG. 14.

Figure 17A:
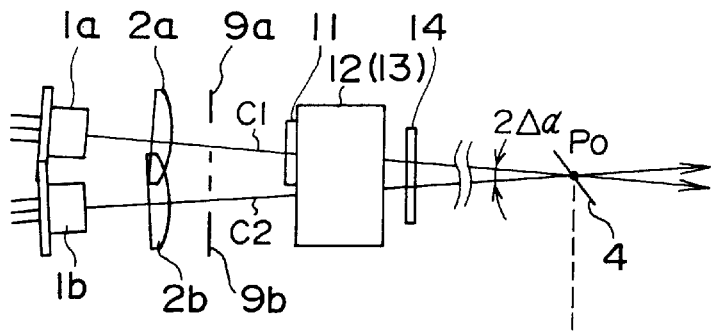
FIGS. 17A and 17B are diagrams showing a part of the optical scanning system according to a sixth embodiment of the present invention respectively in a plan view and a side view.
Figure 17B:
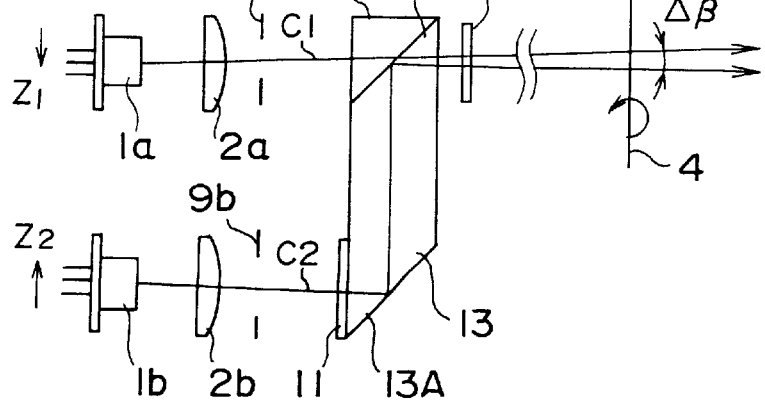

FIGS. 17A and 17B show the construction of an optical scanning system according to a sixth embodiment of the present invention, wherein those parts described previously are designated by the same reference numerals and the description thereof will be omitted.

Referring to FIG. 17A showing the optical scanning system in a plan view as viewed in the direction of the rotational axis of the deflector 4, the optical scanning system has a construction similar to that of FIG. 12 in that the optical beams c1 and c2 cross at the point P0 with a cross angle $2\Delta\alpha$, except that a polarization beam-splitter 12 is inserted into the optical path of the optical beams c1 and c2, wherein the beam-splitter 12 does not cause any substantial change of the optical beam passing therethrough such as deflection, except for a parallel translation of the beams c1 and c2. The cross point P0 is thereby set in the vicinity of the rotational axis of the deflector 4 by taking into consideration the effect of translation of the optical beams c1 and c2 caused by the beam-splitter 12.

FIG. 17B, on the other hand, shows a side view of the optical system of FIG. 17A.

Referring to FIG. 17B, it should be noted that the laser diode 1b is provided offset in the z-direction which is parallel to the rotational axis of the rotary deflector 4. Thus, the laser beam produced by the laser diode 1b impinges upon a reflection surface 13A of the polarization beam-splitter 12 after passing through the collimator lens 2b and a half-wavelength plate 11, which is used for converting the laser beam incident to the beam-splitter 12 into a linearly polarized optical beam. The linearly polarized optical beam is then deflected by a surface 13B formed on the path of the optical beam c1 and the laser beam from the laser diode 1b is emitted as the optical beam c2 with a divergence angle $\Delta\beta$ with respect to the optical beam c1.

As a result of the cross angel $2\Delta\alpha$, the optical beam spots formed by the optical beams c1 and c2 are separated in the horizontal scanning direction on the recording surface 7 by a distance such that detection of the timing of scanning is achieved by using separate photodiodes. Further, as a result of the divergence angle $\Delta\beta$, the optical beam spots are separated on the recording surface 7 by a distance corresponding to the pitch of the horizontal scanning lines in the vertical scanning direction or an integer multiple thereof.

In the construction of FIGS. 17A and 17B, it is of course possible and preferable to form the half-wavelength plate 14 to be integral with the beam-splitter 12.

Figure 18A:
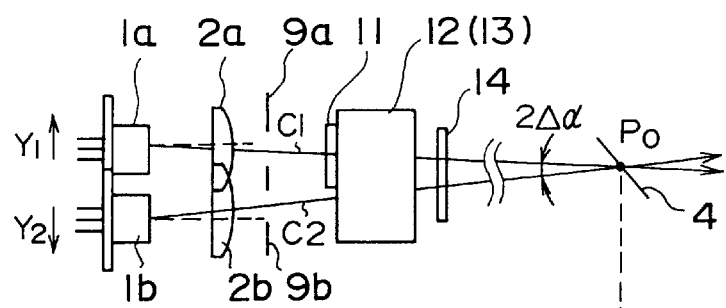
FIGS. 18A and 18B are diagrams showing a part of the optical scanning system according to a seventh embodiment of the present invention respectively in a plan view and a side view.
Figure 18B:
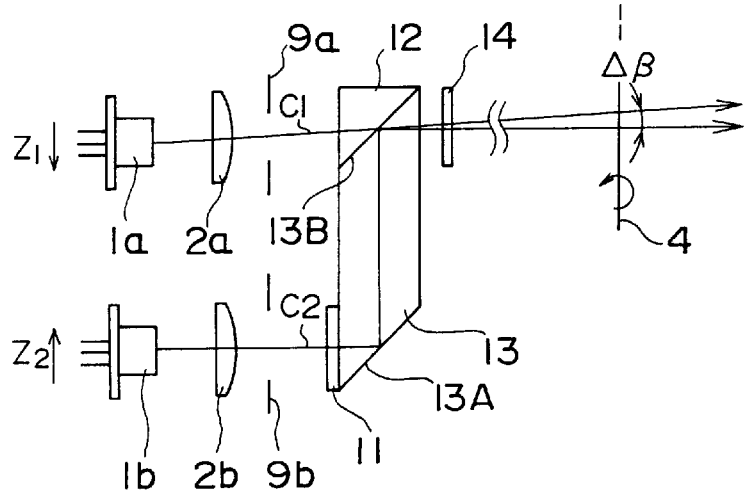

FIGS. 18A and 18B show the construction of an optical scanning system according to a seventh embodiment of the present invention, wherein those parts described previously are designated by the same reference numerals and the description thereof will be omitted.

Referring to FIG. 18A, the laser diodes 1a and 1b emit the respective laser beams in an oblique direction with respect to the optical axis. As the laser diodes 1a and 1b are aligned in the same direction, the construction of FIG. 18A allows the adjustment of the cross point P0 to and from the deflector 4 by merely shifting the laser diodes 1a and 1b in the direction $Y_1$ or $Y_2$ as indicated by arrows in FIG. 18A, similarly to the embodiment of FIG. 14. Otherwise, the construction of the present embodiment is substantially identical to the construction of the embodiment of FIGS. 17A and 17B.

Figure 19:
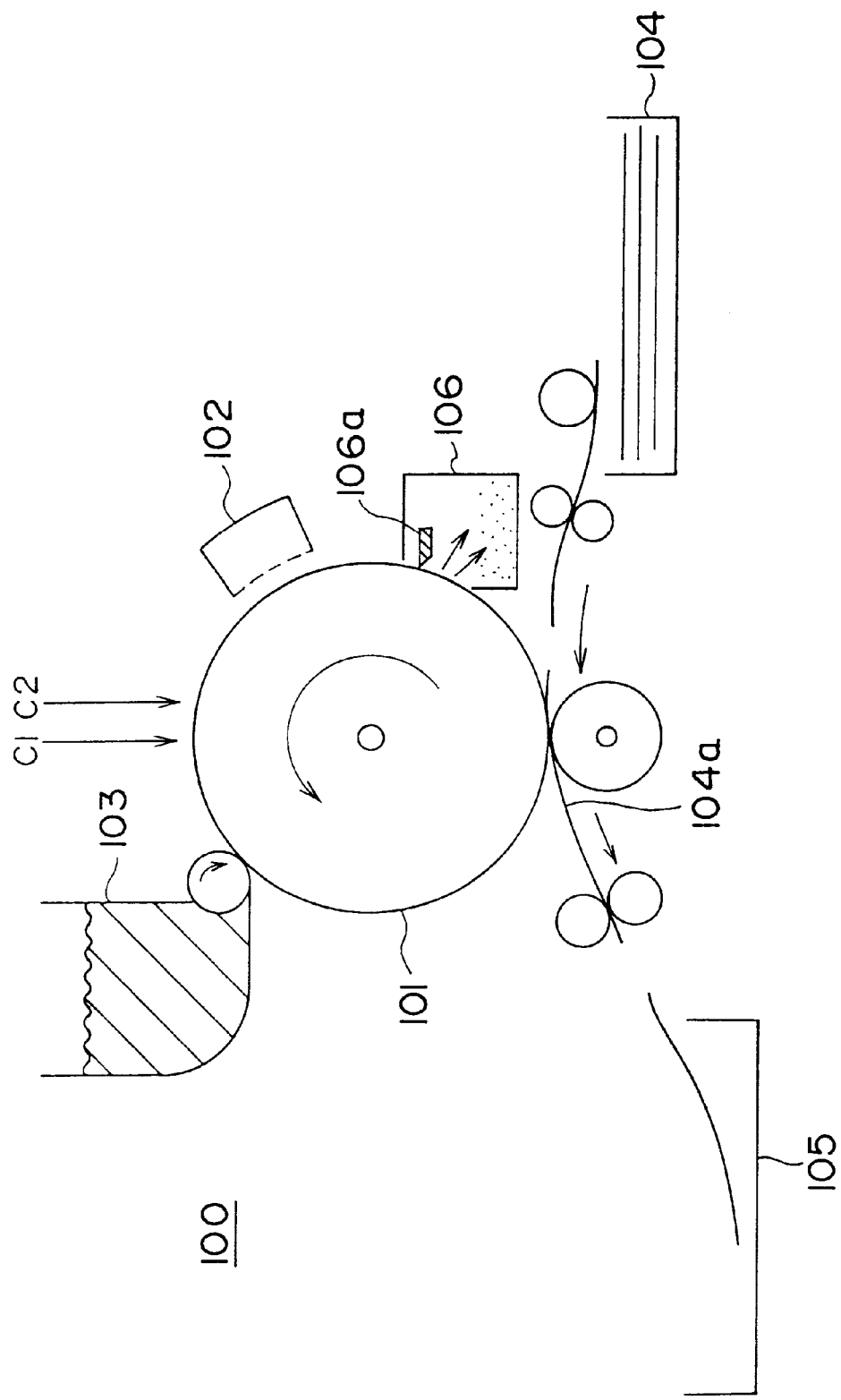
FIG. 19 is a diagram showing the construction of a xerographic printer that uses the optical image formation apparatus of the present invention.

FIG. 19 shows the details of an image recording apparatus 100 used in a xerographic printer or facsimile apparatus that uses the optical recording apparatus of the present invention.

Referring to FIG. 19, the image recording apparatus 100 includes a photosensitive drum 101 corresponding to the optical recording surface 7 of FIG. 6 for carrying an electrostatic latent image that is written thereon by means of the optical beams c1 and c2 of FIG. 6.

Referring to FIG. 19, the image recording apparatus 100 includes, in addition to the photosensitive drum 101, a precharger 102 for precharging the photosensitive drum 101, and the optical scanning system of the present invention scans the surface of the photosensitive drum 101 after it is precharged by means of the optical beams c1 and c2. As a result of the scanning, an electrostatic latent image is formed on the photosensitive drum and the electrostatic latent image thus formed is then developed by a developing unit 103 that coats the photosensitive drum by toners, to form a toner image.

The toner image thus formed on the photosensitive drum 101 is then transferred to a recording sheet 104a that is supplied from a sheet cartridge 104. The recording sheet thus recorded with the toner image is then collected by an outlet tray 105.

After the development, the toners remaining on the photosensitive drum 101 are recovered into a recovery tank 106 by means of a scraping blade 106a.

The image formation apparatus of 100 can be used for various apparatuses such as printers, facsimile apparatuses, and the like. Further, it is possible to replace the photosensitive drum 101 by a photosensitive belt.

Further, the present invention is by no means limited to the embodiments described heretofore, but various variations and modifications may be made without departing from the scope of the invention.

Obviously, numerous modifications and variations of the present invention are possible in light of the above teachings. It is therefore to be understood that within the scope of the appended claims, the invention may be practiced otherwise than as specifically described herein.

What is claimed is:

1. An optical recording apparatus, comprising:

a rotary optical deflector carrying a mirror facet, said rotary optical deflector being rotatable about a rotational axis;

an optical source for producing a plurality of optical beams simultaneously, such that said plurality of optical beams are separated from each other in a direction parallel to said rotational axis and such that said plurality of optical beams intersect with each other substantially at a cross point when viewed in a direction parallel to said rotational axis;

said cross point being located in the vicinity of said rotational axis of said rotary optical deflector, said rotary optical deflector thereby producing a plurality of scanning optical beams corresponding respectively to said plurality of optical beams incident thereto as a result of deflection at said mirror facet;

an optical recording surface; and an optical system disposed between said rotary optical deflector and said optical recording surface, for focusing said plurality of scanning optical beams on said optical recording surface; and said optical recording apparatus further comprises an optical directing device for directing said plurality of scanning optical beams to scanning points on a same optical path such that a deviation in a pitch of said scanning optical beams on said optical recording surface is minimized; and wherein said scanning points have substantially the same coordinate in a horizontal scanning direction on said optical recording surface through said optical system.

2. An optical recording apparatus as claimed in claim 1, wherein said cross point located within a distance of about 60 mm from said rotational axis of said rotary optical deflector.

3. An optical recording apparatus as claimed in claim 2, wherein said cross point is shifted in a direction to said optical recording surface with respect to said rotary optical deflector.

4. An optical recording apparatus as claimed in claim 2, wherein said cross point is shifted in a direction to said optical source with respect to said rotary optical deflector.

5. An optical recording apparatus as claimed in claim 1, wherein said optical source includes a plurality of optical source elements separated from each other, each of said optical source elements emitting an optical beam along an optical axis, said plurality of optical source elements being disposed such that said optical axes cross at said cross point.

6. An optical recording apparatus as claimed in claim 1, wherein said optical source includes a plurality of optical source elements separated from each other, each of said optical source element having an optical axis and emitting an optical beam obliquely with respect to said optical axis, each of said optical source elements being disposed such that said optical axes extend parallel with each other when viewed in the direction parallel to said rotational axis of said rotary optical deflector.

7. An optical recording apparatus as claimed in claim 1, wherein said optical source includes first and second optical source elements separated from each other, said first and second optical source elements being disposed such that an optical axis of said first optical source element and said optical axis of said second optical source element are directed in respective first and second directions that are perpendicular to each other.

8. An optical recording apparatus as claimed in claim 7, wherein said optical recording apparatus further includes an optical beam-splitter disposed in respective optical paths of said optical beams produced by said first and second optical source elements, said optical beam-splitter thereby directing said first and second optical beams such that said first and second optical beams cross with each other at said cross point when viewed in said direction parallel to said rotational axis of said rotary optical deflector.

9. An optical recording apparatus as claimed in claim 1, wherein said plurality of optical beams are separated from each other in a horizontal scanning direction on said recording surface with a distance sufficient for detecting said respective optical beams by means of respective, separated photodetectors.

10. An optical recording apparatus as claimed in claim 1, wherein said plurality of optical beams are separated from each other in a vertical scanning direction on said recording surface with a distance corresponding to an integer multiple of a pitch of horizontal scanning lines formed on said recording surface, said integer multiple including integer one.

11. An optical recording apparatus as claimed in claim 1, wherein said optical recording surface forms an electrostatic latent image thereon in response to a scanning by said scanning optical beams, said optical recording apparatus further includes a toner developing unit for developing said electrostatic latent image by applying toners upon said optical recording surface, said toner developing unit thereby forming a toner image, and an image transfer unit for transferring said toner image to a recording sheet.

12. A multiple-beam optical scanner for scanning a surface by means of a plurality of optical beams, comprising:

a rotary optical deflector carrying a mirror facet, said rotary optical deflector being rotatable about a rotational axis; and an optical source for producing a plurality of optical beams simultaneously, such that said plurality of optical beams are separated from each other in a direction parallel to said rotational axis and such that said plurality of optical beams intersect with each other substantially at a cross point when viewed in a direction parallel to said rotational axis;

said cross point being located in the vicinity of said rotational axis of said rotary optical deflector, said rotary optical deflector thereby producing a plurality of scanning optical beams corresponding respectively to said plurality of optical beams incident thereto as a result of deflection at said mirror facet;

said plurality of scanning optical beams thereby causing a scanning over a scanning surface after deflection by said rotary optical deflector;

said optical recording apparatus further comprises an optical directing device for directing said plurality of scanning optical beams to scanning points on a same optical path such that a deviation in a pitch of said scanning optical beams on said scanning surface is minimized; and wherein said scanning points have substantially the same coordinate in a horizontal scanning direction on said scanning surface.

13. A multiple-beam optical scanner as claimed in claim 12, wherein said cross point is located within a distance of about 60 mm from said rotational axis of said rotary optical deflector.

14. A multiple-beam optical scanner as claimed in claim 13, wherein said cross point is shifted in a direction to said scanning surface with respect to said rotary optical deflector.

15. A multiple-beam optical scanner as claimed in claim 13, wherein said cross point is shifted in a direction to said optical source with respect to said rotary optical deflector.

16. A multiple-beam optical scanner as claimed in claim 12, wherein said optical source includes a plurality of optical source elements separated from each other, each of said optical source elements emitting an optical beam along an optical axis, said plurality of optical source elements being disposed such that said optical axes cross at said cross point.

17. A multiple-beam optical scanner as claimed in claim 12, wherein said optical source includes a plurality of optical source elements separated from each other, each of said optical source element having an optical axis and emitting an optical beam obliquely with respect to said optical axis, each of said optical source elements being disposed such that said optical axes extend parallel with each other when viewed in the direction parallel to said rotational axis of said rotary optical deflector.

18. A multiple-beam optical scanner as claimed in claim 12, wherein said optical source includes first and second optical source elements separated from each other, said first and second optical source elements being disposed such that an optical axis of said first optical source element and said optical axis of said second optical source element are directed in respective first and second directions that are perpendicular to each other.

19. A multiple-beam optical scanner as claimed in claim 18, wherein said optical scanner further includes an optical beam-splitter disposed in respective optical paths of said optical beams produced by said first and second optical source elements, said optical beam-splitter thereby directing said first and second optical beams such that said first and second optical beams cross with each other at said cross point when viewed in said direction parallel to said rotational axis of said rotary optical deflector.

20. An optical recording apparatus as claimed in claim 1, wherein said optical system includes a fθ mirror and a cylindrical lens.

21. An optical recording apparatus as claimed in claim 1, wherein said plurality of scanning optical beams experience exactly the same refraction or reflection when reaching said respective scanning points.

22. An optical recording apparatus as claimed in claim 12, wherein said plurality of scanning optical beams experience exactly the same refraction or reflection when reaching said respective scanning points.

23. An optical recording apparatus, comprising:

a rotary optical deflector carrying a mirror facet, said rotary optical deflector being rotatable about a rotational axis;

an optical source for producing a plurality of optical beams simultaneously, such that said plurality of optical beams are separated from each other in a direction parallel to said rotational axis and such that said plurality of optical beams intersect with each other substantially at a cross point when viewed in a direction parallel to said rotational axis;

said cross point being located in the vicinity of said rotational axis of said rotary optical deflector, said rotary optical deflector thereby producing a plurality of scanning optical beams corresponding respectively to said plurality of optical beams incident thereto as a result of deflection at said mirror facet;

an optical recording surface; and an optical system disposed between said rotary optical deflector and said optical recording surface, for focusing said plurality of scanning optical beams on said optical recording surface;

said optical source is arranged for directing said plurality of scanning optical beams to scanning points on a same optical path such that a deviation in a pitch of said scanning optical beams on said optical recording surface is minimized; and wherein said scanning points have substantially the same coordinate in a horizontal scanning direction on said optical recording surface through said optical system.

24. A multiple-beam optical scanner for scanning a surface by means of a plurality of optical beams, comprising:

a rotary optical deflector carrying a mirror facet, said rotary optical deflector being rotatable about a rotational axis; and an optical source for producing a plurality of optical beams simultaneously, such that said plurality of optical beams are separated from each other in a direction parallel to said rotational axis and such that said plurality of optical beams intersect with each other substantially at a cross point when viewed in a direction parallel to said rotational axis;

said cross point being located in the vicinity of said rotational axis of said rotary optical deflector, said rotary optical deflector thereby producing a plurality of scanning optical beams corresponding respectively to said plurality of optical beams incident thereto as a result of deflection at said mirror facet;

said plurality of scanning optical beams thereby causing a scanning over a scanning surface after deflection by said rotary optical deflector;

said optical source is arranged for directing said plurality of scanning optical beams to scanning points on a same optical path such that a deviation in a pitch of said scanning optical beams on said scanning surface is minimized; and wherein said scanning points have substantially the same coordinate in a horizontal scanning direction on said scanning surface.

25. An optical recording apparatus, comprising:
a rotary optical deflector means having a mirror facet, for rotating about a rotational axis, and for producing a plurality of scanning optical beams;
an optical source means for producing a plurality of optical beams simultaneously, such that said plurality of optical beams are separated from each other in a direction parallel to said rotational axis and such that said plurality of optical beams intersect with each other substantially at a cross point when viewed in a direction parallel to said rotational axis;
said cross point being located in the vicinity of said rotational axis of said rotary optical deflector means, said rotary optical deflector means thereby producing a plurality of scanning optical beams corresponding respectively to said plurality of optical beams incident thereto as a result of deflection at said mirror facet;
an optical recording surface; and
an optical system disposed between said rotary optical deflector means and said optical recording surface, for focusing said plurality of scanning optical beams on said optical recording surface;
said optical recording apparatus further comprises an optical directing means for directing said plurality of scanning optical beams to scanning points on a same optical path such that a deviation in a pitch of said scanning optical beams on said optical recording surface is minimized; and
wherein said scanning points have substantially the same coordinate in a horizontal scanning direction on said optical recording surface through said optical system.

26. An optical recording apparatus, comprising:
a rotary optical deflector means having a mirror facet, for rotating about a rotational axis, and for producing a plurality of scanning optical beams;
an optical source means for producing a plurality of optical beams simultaneously, such that said plurality of optical beams are separated from each other in a direction parallel to said rotational axis and such that said plurality of optical beams intersect with each other substantially at a cross point when viewed in a direction parallel to said rotational axis;
said cross point being located in the vicinity of said rotational axis of said rotary optical deflector means, said rotary optical deflector means thereby producing a plurality of scanning optical beams corresponding respectively to said plurality of optical beams incident thereto as a result of deflection at said mirror facet;
an optical recording surface; and
an optical system disposed between said rotary optical deflector means and said optical recording surface, for focusing said plurality of scanning optical beams on said optical recording surface;
said optical source means is arranged for directing said plurality of scanning optical beams to scanning points on a same optical path such that a deviation in a pitch of said scanning optical beams on said optical recording surface is minimized; and
wherein said scanning points have substantially the same coordinate in a horizontal scanning direction on said optical recording surface through said optical system.

27. A multiple-beam optical scanner for scanning a surface by means of a plurality of optical beams, comprising:
a rotary optical deflector means having a mirror facet, for rotating about a rotational axis, and for producing a plurality of scanning optical beams; and
an optical source means for producing a plurality of optical beams simultaneously, such that said plurality of optical beams are separated from each other in a direction parallel to said rotational axis and such that said plurality of optical beams intersect with each other substantially at a cross point when viewed in a direction parallel to said rotational axis;
said cross point being located in the vicinity of said rotational axis of said rotary optical deflector means, said rotary optical deflector means thereby producing said plurality of scanning optical beams corresponding respectively to said plurality of optical beams incident thereto as a result of deflection at said mirror facet;
said plurality of scanning optical beams thereby causing a scanning over a scanning surface after deflection by said rotary optical deflector means;
said optical recording apparatus further comprises an optical directing means for directing said plurality of scanning optical beams to scanning points on a same optical path such that a deviation in a pitch of said scanning optical beams on said scanning surface is minimized; and
wherein said scanning points have substantially the same coordinate in a horizontal scanning direction on said scanning surface.

28. A multiple-beam optical scanner for scanning a surface by means of a plurality of optical beams, comprising:
a rotary optical deflector means having a mirror facet, for rotating about a rotational axis, and for producing a plurality of scanning optical beams; and
an optical source means for producing a plurality of optical beams simultaneously, such that said plurality of optical beams are separated from each other in a direction parallel to said rotational axis and such that said plurality of optical beams intersect with each other substantially at a cross point when viewed in a direction parallel to said rotational axis;
said cross point being located in the vicinity of said rotational axis of said rotary optical deflector means, said rotary optical deflector means thereby producing said plurality of scanning optical beams corresponding respectively to said plurality of optical beams incident thereto as a result of deflection at said mirror facet;
said plurality of scanning optical beams thereby causing a scanning over a scanning surface after deflection by said rotary optical deflector means;
said optical source means is arranged for directing said plurality of scanning optical beams to scanning points on a same optical path such that a deviation in a pitch of said scanning optical beams on said scanning surface is minimized; and
wherein said scanning points have substantially the same coordinate in a horizontal scanning direction on said scanning surface.

29. An optical recording method, comprising:
rotating a rotary optical deflector having a mirror facet about a rotational axis, and producing a plurality of scanning optical beams; and
producing, via an optical source, a plurality of optical beams simultaneously, such that said plurality of optical beams are separated from each other in a direction parallel to said rotational axis and such that said plurality of optical beams intersect with each other substantially at a cross point when viewed in a direction parallel to said rotational axis;

locating said cross point in the vicinity of said rotational axis of said rotary optical deflector, and producing via said rotary optical deflector, said plurality of scanning optical beams corresponding respectively to said plurality of optical beams incident thereto as a result of deflection at said mirror facet;

focusing said plurality of scanning optical beams on an optical recording surface via an optical system disposed between said rotary optical deflector and said optical recording surface;

directing, via an optical directing device, said plurality of scanning optical beams to scanning points on a same optical path such that a deviation in a pitch of said scanning optical beams on said optical recording surface is minimized; and providing said scanning points to have substantially the same coordinate in a horizontal scanning direction on said optical recording surface through said optical system.

30. An optical recording method, comprising:

rotating a rotary optical deflector having a mirror facet about a rotational axis, and producing a plurality of scanning optical beams; and producing, via an optical source, a plurality of optical beams simultaneously, such that said plurality of optical beams are separated from each other in a direction parallel to said rotational axis and such that said plurality of optical beams intersect with each other substantially at a cross point when viewed in a direction parallel to said rotational axis;

locating said cross point in the vicinity of said rotational axis of said rotary optical deflector, and producing via said rotary optical deflector, said plurality of scanning optical beams corresponding respectively to said plurality of optical beams incident thereto as a result of deflection at said mirror facet;

focusing said plurality of scanning optical beams on an optical recording surface via an optical system disposed between said rotary optical deflector and said optical recording surface;

arranging said optical source for directing said plurality of scanning optical beams to scanning points on a same optical path such that a deviation in a pitch of said scanning optical beams on said optical recording surface is minimized; and providing said scanning points to have substantially the same coordinate in a horizontal scanning direction on said optical recording surface through said optical system.

31. A method for scanning a surface by means of a plurality of optical beams via a multiple-beam optical scanner, comprising:

rotating a rotary optical deflector having a mirror facet about a rotational axis, and producing a plurality of scanning optical beams; and producing, via an optical source, a plurality of optical beams simultaneously, such that said plurality of optical beams are separated from each other in a direction parallel to said rotational axis and such that said plurality of optical beams intersect with each other substantially at a cross point when viewed in a direction parallel to said rotational axis;

locating said cross point in the vicinity of said rotational axis of said rotary optical deflector, and producing via said rotary optical deflector, said plurality of scanning optical beams corresponding respectively to said plurality of optical beams incident thereto as a result of deflection at said mirror facet;

causing a scanning over a scanning surface via said plurality of scanning optical beams being deflected by said rotary optical deflector;

directing, via an optical directing device, said plurality of scanning optical beams to scanning points on a same optical path such that a deviation in a pitch of said scanning optical beams on said scanning surface is minimized; and providing said scanning points to have substantially the same coordinate in a horizontal scanning direction on said scanning surface.

32. A method for scanning a surface by means of a plurality of optical beams via a multiple-beam optical scanner, comprising:

rotating a rotary optical deflector having a mirror facet about a rotational axis, and producing a plurality of scanning optical beams; and producing, via an optical source, a plurality of optical beams simultaneously, such that said plurality of optical beams are separated from each other in a direction parallel to said rotational axis and such that said plurality of optical beams intersect with each other substantially at a cross point when viewed in a direction parallel to said rotational axis;

locating said cross point in the vicinity of said rotational axis of said rotary optical deflector, and producing via said rotary optical deflector, said plurality of scanning optical beams corresponding respectively to said plurality of optical beams incident thereto as a result of deflection at said mirror facet;

causing a scanning over a scanning surface via said plurality of scanning optical beams being deflected by said rotary optical deflector;

arranging said optical source for directing said plurality of scanning optical beams to scanning points on a same optical path such that a deviation in a pitch of said scanning optical beams on said scanning surface is minimized; and providing said scanning points to have substantially the same coordinate in a horizontal scanning direction on said scanning surface.

* * * * *